(No Model.)
J. STAMM.
ELECTRIC ANNUNCIATOR.
No. 570,967. Patented Nov. 10, 1896.
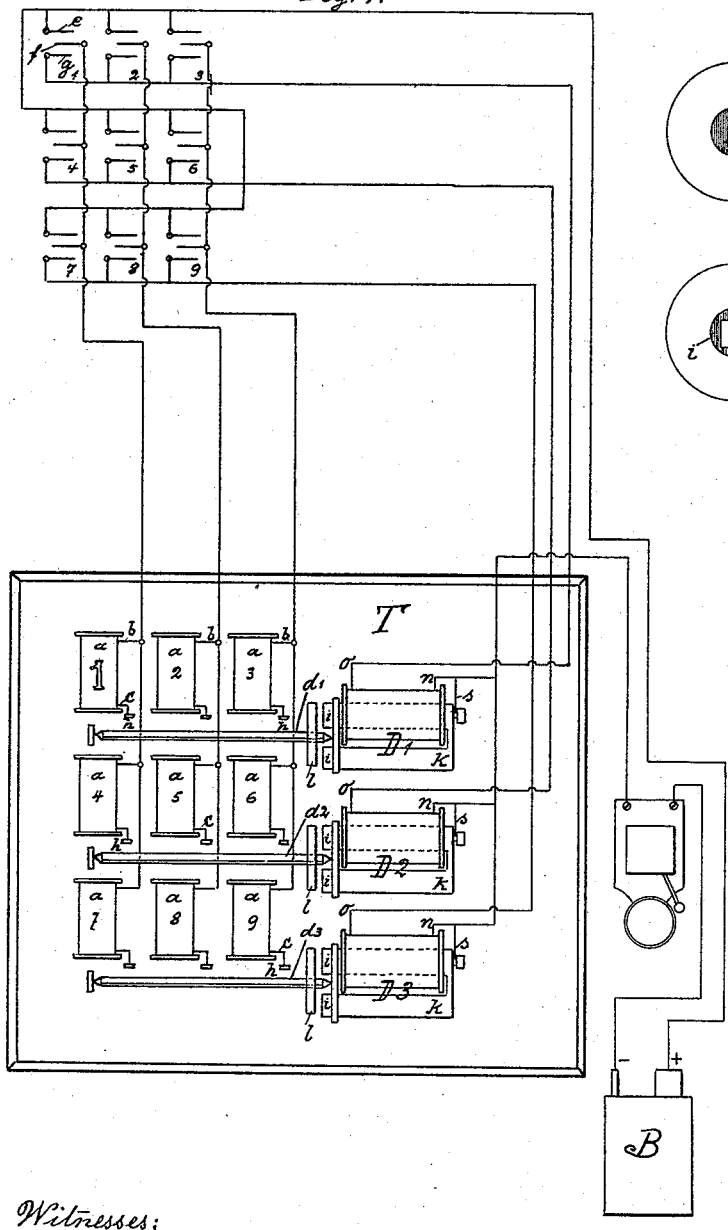
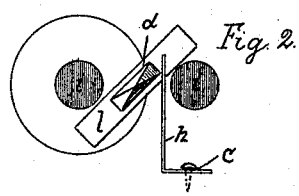
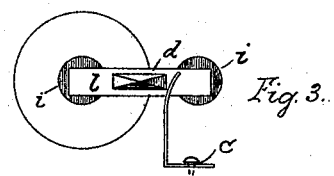
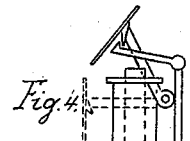
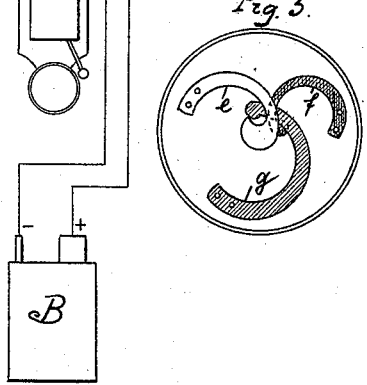
Witnesses:
W. G. Whiting
William Schulz
Inventor:
Jacob Stamm
by his attorneys
Roeder & Briesen

UNITED STATES PATENT OFFICE.

JACOB STAMM, OF STUTTGART, GERMANY.

ELECTRIC ANNUNCIATOR.

SPECIFICATION forming part of Letters Patent No. 570,967, dated November 10, 1896.

Application filed July 10, 1895. Serial No. 555,515. (No model.)

*To all whom it may concern:*

Be it known that I, JACOB STAMM, a citizen of Germany, and a resident of Stuttgart, Wurtemberg, Germany, have invented certain new and useful Improvements in Electric Annunciators, of which the following is a specification.

This invention relates to means for causing the electromagnets of an annunciator to be put into circuit in groups, to the automatic electric circuit-closers, and the arrangement of the conducting-wires, which are so placed that by the use of a third contact-spring in the push-buttons the number of the conducting-wires to the central station or annunciator is greatly diminished.

In the accompanying drawings, Figure 1 is a diagram illustrating my invention. Figs. 2 and 3 are end views of rods $d$; Fig. 4, a side view of one of the electromagnets 1 to 9 of the annunciator with the drop lowered. These electromagnets may be arranged in groups side by side and of suitable number, groups of three being shown. Fig. 5 represents one of the push-buttons provided with three contact-springs $e\ f\ g$.

Each room or call-station (1 to 9) is provided with one of the push-buttons. If, say, the top spring of the push-button 1 is pressed upon the central spring $f$, the positive current contained in the top spring will be sent to all the connected springs $f$ of the buttons 1, 4, and 7 and to the connections $b$ of the electromagnets $a'\ a^4\ a^7$, which are connected with each other within the annunciator. If the springs $f$ and $e$ of the button are depressed upon the third spring $g$, the positive current will travel here also through all the connected springs $g$ of the buttons 1 2 3 and to the connection $o$ of the coil of the electromagnet $D'$, Fig. 1. The electromagnets $D'\ D^2\ D^3$ are so connected with the negative pole of the generator or battery B that the current enters the metal bodies $k$ of the electromagnets $D'\ D^2\ D^3$ at $s$. Thence it goes to pointed bars $d'\ d^2\ d^3$, revoluble in bearings and secured to the armature $l$. This negative pole is furthermore connected at $n$ with the coils of the electromagnets $D'\ D^2\ D^3$. The positive pole of the battery is connected with all the top springs $e$ of the buttons. The wires $b$ of the coils in the annunciator are so connected that out of each horizontal group of electromagnets $a$ one is in circuit.

For greater clearness, the drawings show the electromagnets connected in vertical rows, which arrangement is, however, not imperative. If, say, the springs $f$ of the buttons 1 5 9 are connected and conducted to the annunciator, the wires $b$ of the electromagnets $a'\ a^5\ a^9$ must be connected. The other wire $c$ of the electromagnetic coils $a'$ to $a^9$ in annunciator T are each attached separably to one of the metal bars $d'\ d^2\ d^3$ opposite to the contact-springs $h$. The metal bars $d$ are of elliptic or angular form in cross-section, Figs. 2 and 3. The three electromagnets form in their metal bodies $k$ a horseshoe magnet having two poles $i$. When the armature $l$ is at rest, Fig. 2, the springs $h$ are insulated from the metal bar $d$. If the circuit is closed by the coil, the armature $l$ will vibrate horizontally to the horseshoe-magnet pole $i$, Fig. 3, and the metal rod $d$ will now make contact with all the springs $h$ which are located opposite to it. As the negative pole enters the metal body $k$ at $s$ this current is transmitted through the metal rod $d$ to the springs $h$.

The operation is as follows: If the contact-springs are compressed at button 5, the positive current is conducted from the upper spring $e$ to the second spring $f$ of buttons 5 8, and thence to connections $b$ of the electromagnets $a^2\ a^5\ a^8$ in annunciator T. At the other end, or at the contact-spring $h$ of electromagnet $a^5$, the positive current awaits the closing of the circuit with the negative pole of the battery B. If the springs in button 5 are further depressed, the upper two springs $e f$ will conduct their positive current to the lower spring $g$ of button 5. The current will pass the buttons 4 5 6 and enter the coil of the electromagnet $D^2$ at $o$. As the negative pole is already connected with the coil at $n$, the circuit is closed within the electromagnet and the armature vibrates into the horizontal direction of the horseshoe-magnet poles $i$, Fig. 3. The negative pole of the battery B, which is also conducted at $s$ into the metal body $k$ of the electromagnet $D^2$, is now connected, through metal body and metal rod $d^2$, to the spring $h$ of electromagnet $a^5$, and thus the circuit is closed within the electromagnet and the drop 5 is made to fall.

What I claim is—

1. An electric annunciator composed of central station, push-buttons, wire connections, a series of electromagnets $a$, and electromagnetic circuit-closers D, adapted to switch the electromagnets $a$, in groups into the circuit, substantially as specified.

2. An electric annunciator composed of central station, push-buttons, having three contact-springs $e$, $f$, $g$, wire connections, electromagnets $a$, having drops, and electromagnetic circuit-closers D, all being so constructed that the two uppermost springs are adapted to conduct the current to electromagnets $a$, while the lowermost spring $g$, is adapted to conduct the current to the corresponding circuit-closer D, substantially as specified.

3. An annunciator having central station, push-buttons with springs $e$, $f$, $g$, electromagnets $a$, electromagnetic circuit-closers D, and a series of conducting-wires so arranged that the springs $f$, are connected to each other to correspond to the connected electromagnets $a$, to which they lead, while the springs $g$, are connected in groups and conduct the current to the corresponding circuit-closers D, substantially as specified.

Signed at Stuttgart, in the county of Stuttgart and State of Wurtemberg, this 19th day of June, A. D. 1895.

JACOB STAMM.

Witnesses:
JOSEPH JERZYKOWSKI,
LUDWIG HOFFMANN.